United States Patent
Ton (10) Patent No.: US 6,397,162 B1
(45) Date of Patent: May 28, 2002

(54) SYSTEM, DEVICE AND METHOD FOR ESTIMATING EVAPO-TRANSPIRATION IN PLANTS

(75) Inventor: Yuri Ton, Petach-Tikva (IL)

(73) Assignee: Phytech Ltd., Ashkelon (IL)

( * ) Notice: Subject to any disclaimer, the term of this patent is extended or adjusted under 35 U.S.C. 154(b) by 0 days.

(21) Appl. No.: 09/277,754

(22) Filed: Mar. 29, 1999

(51) Int. Cl.⁷ .............................. G06F 15/00; G01N 7/00
(52) U.S. Cl. ...................... 702/136; 702/188; 73/29.01
(58) Field of Search ................................ 702/136, 188, 702/130; 700/284, 286, 285; 73/25.01, 29.01; 239/69

(56) References Cited

U.S. PATENT DOCUMENTS

| | | | |
|---|---|---|---|
| 4,195,441 A | * | 4/1980 | Baldwin .......................... 47/17 |
| 4,599,889 A | * | 7/1986 | Pateras Pescova de Castelluccio .......... 73/25.01 |
| 5,001,859 A | * | 3/1991 | Sprung ........................... 47/17 |
| 5,748,495 A | * | 5/1998 | Arita et al. .................. 702/185 |
| 5,870,302 A | * | 2/1999 | Oliver .......................... 239/69 |

OTHER PUBLICATIONS

Wageningen; Greenhouse Climate control an integrated approach; Wageningen Pers. 1995 (5 pages, including pp. 142–144), 1995.*

* cited by examiner

Primary Examiner—Bryan Bui (57) ABSTRACT

A system for estimating evapo-transpiration from a plant is provided. The system includes (a) a first detector for detecting environmental radiation at a vicinity of the plant; (b) a second detector for detecting air humidity at a vicinity of the plant; (c) a third detector for detecting air temperature at a vicinity of the plant; (d) a fourth detector for detecting boundary diffusion layer resistance at a vicinity of the plant; and (e) a processor communicating with the first, second third and fourth detectors for retrieving data from the first, second third and fourth detectors and for calculating, based on the data a value corresponding to the evapo-transpiration from the plant.

17 Claims, 5 Drawing Sheets

SYSTEM, DEVICE AND METHOD FOR ESTIMATING EVAPO-TRANSPIRATION IN PLANTS

FIELD AND BACKGROUND OF THE INVENTION

The present invention relates to a system, device and method for obtaining data pertaining to the stress state of a plant and its environment and for displaying such data in a readily interpretable manner. More particularly, the present invention relates to a system and method which incorporate a detector device for determining the boundary diffusion layer resistance in an environment in which a plant is cultivated, such that accurate estimation of evapo-transpiration of the plant can be effected.

Cultivation of commercial crops depends on the monitoring of the hydration of a plant or field. Maintaining the correct hydration, which is dependent on several factors including irrigation scheduling and the like is crucial for the proper development of plants and as such, precise monitoring of the hydration, at any given stage of development is advantageous.

In the past growers have mainly relied on their intuition and expertise in assessing crop hydration conditions. This expertise relied mainly on crop and soil inspection and observing the environmental conditions in which the crop was cultivated. One working assumption often relied upon, was that evaporation equals precipitation. Although this method was generally successful in predicting the condition of the crop field, it was time consuming and inaccurate mainly since the growth conditions in a field vary from one area to another. Furthermore, experience gained by a grower cultivating a certain crop under certain conditions could not be recorded or analyzed and as such was not applicable to other crops or other cultivation conditions.

The need for a more precise method with which a grower can monitor the hydration and stress of a plant has led to several solutions.

One such solution involves the use of a pan for monitoring the evaporation (Ep) of water therefrom in a specific environment. Such a pan is placed in a field or greenhouse in which the plants cultivated are to be monitored. The evaporation data collected can be converted to evapo-transpiration (Et) data of the plants by the use of correction factors which vary from 0.5 to 0.85 (Et/Ep) depending on the climatic and crop conditions.

Although this method presents a significant improvement to the above practice, it still lacks accuracy. In addition, the pan employed requires regular maintenance such as keeping the water clean, etc. Furthermore, this method is difficult to automate, and is not detective enough to small changes in the plant or environment.

In recent years, in an effort to overcome the limitations inherent to the system and methods described above, growers have increasingly utilized systems and devices which include arrays of precise detectors for measuring the temperature and humidity and other related parameters of the environment and/or soil proximal to the cultivated plants.

The advent of such precise monitoring technologies and methodologies enabled growers to track and record changes in a field or greenhouse enabling close monitoring, in some cases, of a single plant.

The information recorded is analyzed and the resultant data incorporated into a plant hydration profile, such a profile can then be used to assess crop condition and development through daily and seasonal changes. For further details see, for example, Wolf, B. Diagnostic Technique for Improving Crop Production. Haworth Press. P.185–187.

Numerous models exist and are presently in use for analyzing the collected data from monitored plants, examples include, but are not limited to, the Hargraves equation and the Harmon equation (for reference see, Shuttleworth, W. J. 1993, Evaporation Ch. 4 In D. R. Maidment (ed.) Handbook of Hydrology, Mcgraw-Hill, which is incorporated herein by reference). The major difference between these various models is derived from the type of data collected. One of the accurate and most commonly used model is the Penman equation (Greenhouse climate control: an integrated approach. J. C. Bakker, G. P. A. Bot, H. Challa, N. J. Van de Braak, Eds. Wageningen Press, Wageningen, 1995, p. 143). The Penman equation can be expressed as follows:

$$LE = \frac{s}{s+\gamma}R_n + \frac{\rho_a C_a}{r_b}\frac{D}{s+\gamma} \quad \text{(Equation 1)}$$

where E is the evaporative water flux density (kg m$^{-2}$s$^{-1}$); L is the heat of evaporation (J kg$^{-1}$); s is the slope of the saturated vapor pressure curve (Pa K$^{-1}$); $\gamma$ is the thermodynamic psychrometric constant (Pa K$^{-1}$); $R_n$ is the net radiation (W m$^{-2}$); $\rho_a$ is the air density (kg m$^{-3}$); $C_a$ is the specific air heat (J kg$^{-1}$s$^{-1}$); D is the vapor pressure saturation deficit (Pa); and $r_b$ is the boundary diffusion layer resistance (s m$^{-1}$).

According to the Penman equation and other similar models, the rate of evapo-transpiration from a plant is resolved by incorporating data from several detectors/sensors such as of humidity and temperature into an equation. However, in plant leaves and for that matter any other evaporative surfaces, there exists a layer of humidified air which drastically decreases the evapo-transpiration from such a surface. This layer is known as the boundary diffusion layer, and the effect thereof on evapo-transpiration is termed the boundary diffusion layer resistance ($r_h$). Since this effect drastically decreases the evapo-transpiration from a plant, precluding this parameter when calculating an evapo-transpiration rate from a plant often results in an erroneous hydration data.

Presently, there exists no system or method which employ an accurate detector for determining the boundary diffusion layer resistance of a given environment. As such, data collected from a plant cultivated in a field or a greenhouse is often processed with a disregard to this parameter. Such omission of data pertaining to this important parameter, often leads to an erroneous cultivar hydration profile and as such to great losses in crops.

In addition, the data provided to a grower utilizing present day systems and methods is presented as numerical data. Such presentation can often be difficult to perceive and analyze and as such requires an experienced operator to decipher.

There is thus a widely recognized need for, and it would be highly advantageous to have, a method and system for measuring and displaying the stress state of a plant which is devoid of the above limitations of the prior art.

SUMMARY OF THE INVENTION

According to one aspect of the present invention there is provided a system for co-displaying a state of a plant and its environment, the system comprising (a) at least one environment detector for monitoring at least one parameter of the plant's environment; (b) at least one canopy detector for monitoring at least one parameter of the plant itself; (c) a processor for processing the at least one parameter of the plant's environment and the at least one parameter of the plant itself for obtaining at least one processed parameter of the plant's environment and at least one processed parameter of the plant itself; and (d) a display for co-displaying the at least one processed parameter of the plant's environment and the at least one processed parameter of the plant itself, such that each of the at least one processed parameter of the plant's environment is realized by a first displayed area of a first color selected among at least two first colors, wherein each of the at least two first colors represents a range of the at least one parameter of the plant's environment, and further such that each of the at least one processed parameter of the plant itself is realized by a second displayed area of a second color selected among at least two second colors, wherein each of the at least two second colors represents a range of the at least one parameter of the plant itself.

According to another aspect of the present invention there is provided a method for displaying a state of a plant and it's environment, the method comprising the steps of (a) monitoring at least one parameter of the plant's environment; (b) monitoring at least one parameter of the plant itself; (c) processing the at least one parameter of the plant's environment and the at least one parameter of the plant itself for obtaining at least one processed parameter of the plant's environment and at least one processed parameter of the plant itself; and (d) co-displaying the at least one processed parameter of the plant's environment and the at least one processed parameter of the plant itself, such that each of the at least one processed parameter of the plant's environment is realized by a first displayed area of a first color selected among at least two first colors, wherein each of the at least two first colors represents a range of the at least one parameter of the plant's environment, and further such that each of the at least one processed parameter of the plant itself is realized by a second displayed area of a second color selected among at least two second colors, wherein each of the at least two second colors represents a range of the at least one parameter of the plant's itself.

According to further features in preferred embodiments of the invention described below, each of the first color and the second color is independently selected from the group consisting of a red color, a green color and a yellow color.

According to still further features in the described preferred embodiments the at least one environment detector and the at least one canopy detector detect a parameter of the same nature.

According to still further features in the described preferred embodiments the at least one environment detector is selected from the group consisting of an air humidity detector, an air temperature detector, a boundary diffusion layer resistance detector, a solar radiation detector, a soil moisture detector and a soil temperature detector.

According to still further features in the described preferred embodiments the at least one canopy detector is selected from the group consisting of a leaf temperature detector, a flower temperature detector, a fruit surface temperature detector, a stem flux relative rate detector, a stem diameter variation detector, a fruit growth rate detector and a leaf $CO_2$ exchange detector.

According to still further features in the described preferred embodiments the display is selected from the group consisting of a computer screen display, a monitor display, an image projector and a printer.

According to yet another aspect of the present invention there is provided a system for estimating evapo-transpiration from a plant, the system comprising (a) a first detector for detecting environmental radiation at a vicinity of the plant; (b) a second detector for detecting air humidity at a vicinity of the plant; (c) a third detector for detecting air temperature at a vicinity of the plant; (d) a fourth detector for detecting boundary diffusion layer resistance at a vicinity of the plant; and (e) a processor communicating with the first, second third and fourth detectors for retrieving data from the first, second third and fourth detectors and for calculating, based on the data a value corresponding to the evapo-transpiration from the plant.

According to still another aspect of the present invention there is provided a method of estimating evapo-transpiration from a plant, the method comprising the steps of collecting values corresponding to an environmental radiation, an air humidity, an air temperature and a boundary diffusion layer resistance at a vicinity of the plant and using the values for calculating a value corresponding to the evapo-transpiration from the plant.

According to further features in preferred embodiments of the invention described below, the first, second and third detectors are used for obtaining a slope of the saturated vapor pressure curve, a net radiation, an air density, a specific air heat and a vapor pressure saturation deficit.

According to still further features in the described preferred embodiments the value corresponding to the evapo-transpiration from the slant (LE) is determined by:

$$LE = \frac{s}{s+\gamma}R_n + \frac{\rho_a C_a}{r_b}\frac{D}{s+\gamma}$$

where E is the evaporative water flux density (kg m$^{-2}$s$^{-1}$); L is the heat of evaporation (J kg$^{-1}$); s is the slope of the saturated vapor pressure curve (Pa K$^{-1}$); $\gamma$ is a thermodynamic psychrometric constant (Pa K$^{-1}$); $R_n$ is the net radiation (W m$^{-2}$); $\rho_a$ is the air density (kg m$^{-3}$); $C_a$ is the specific air heat (J kg$^{-1}$ s$^{-1}$); D is the vapor pressure saturation deficit (Pa); and $r_b$ is the boundary diffusion layer resistance (s m$^{-1}$).

According to still further features in the described preferred embodiments the fourth detector includes (i) a first element having a first diffusion layer; (ii) a second element having a second diffusion layer and a source of thermal energy therein; and (iii) a thermocouple coupling the first element and the second element; wherein, when the source of thermal energy provides the second element with a quanta of thermal energy, measuring a temperature difference between each of the first and second elements and the environment and accounting for an air density and a specific air heat of the environment and further for mean flux density of available radiation of each of the first and second elements, enables to calculate the evapo-transpirative resistance of the boundary diffusion layer in the environment.

According to still further features in the described preferred embodiments the first diffusion layer of the first element and the second diffusion layer of the second element are identical, such that the mean flux density of available radiation of each of the first and second elements are identical.

According to an additional aspect of the present invention there is provided a method for measuring the evapo-transpirative resistance of a boundary diffusion layer in an environment, the method comprising the steps of (a) introducing into the environment a detector including (i) a first element having a first diffusion layer; (ii) a second element having a second diffusion layer and a source of thermal energy therein; and (iii) a thermocouple coupling the first element and the second element; (b) using the source of thermal energy for providing the second element of the detector with a quanta of thermal energy; and (c) measuring a temperature difference between each of the first and second elements and the environment and while accounting for an air density and a specific air heat of the environment and further for a mean flux density of available radiation of each of the first and second elements calculating the evapo-transpirative resistance of the boundary diffusion layer in the environment.

The present invention successfully addresses the shortcomings of the presently known configurations by providing means for determining the boundary diffusion layer resistance and thereby means for estimating the evapo-transpiration from a plant. The present invention further successfully addresses the shortcomings of the presently known configurations by providing useful means for displaying the stress of, or imposed on, the plant.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system, device and method for obtaining data pertaining to a stress state of a plant and its immediate environment and for displaying such data in a readily interpretable manner. Specifically, the present invention can be used to determine the boundary diffusion layer resistance in an environment in which a plant is cultivated, such that accurate estimation of evapo-transpiration of the plant can be effected.

The principles and operation of a method and system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
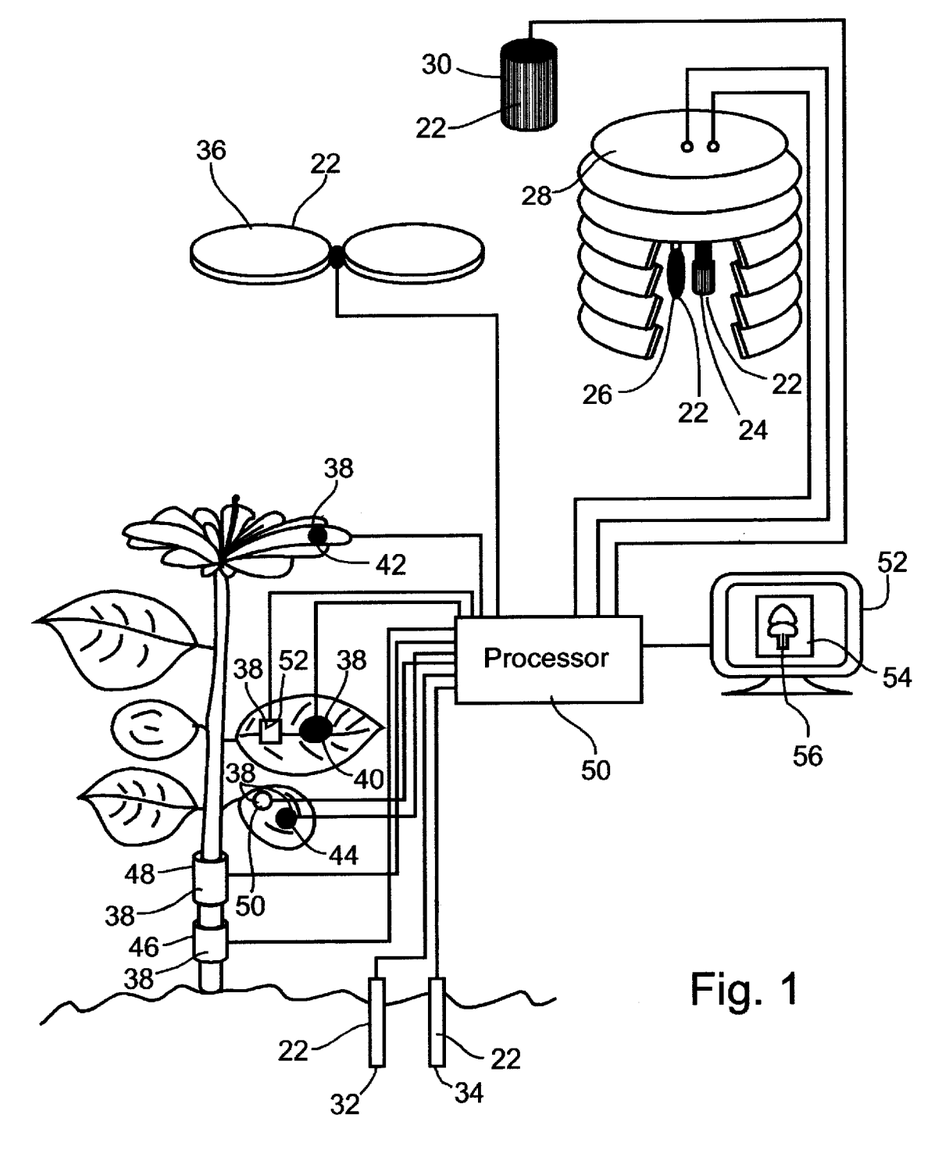
FIG. 1 is a schematic depiction of a system for co-displaying a stress state of a plant and its environment according to one aspect of the present invention, which system incorporates a plurality of environment and plant detectors for monitoring a plurality of environment and plant parameters which are processed and are thereafter co-displayed on a display in a manner readily interpretable by a grower.

According to one aspect, the present invention provides a system for co-displaying a state of a plant and of its environment, which system is referred to hereinbelow as system 20.

System 20 according to this aspect of the present invention includes at least one environment detector 22 which serves for monitoring at least one parameter of the plant's environment. Preferably, a plurality of environment detectors 22 are co-employed.

As used herein in the specification and in the claims section that follows, the term "detector" also means sensor.

Such detectors 22 can include, for example, an air humidity detector 24 and an air temperature detector 26, which are protected from direct radiation by a radiation shield 28, a solar radiation detector 30, a soil moisture detector 32 and a soil temperature detector 34, which are embedded in the soil in the plant's vicinity.

As further detailed hereinunder, an environment detector important for estimating the evapo-transpiration from the plant, which detects the boundary diffusion layer resistance in the environment, marked at 36 in FIG. 1, is also employed. The operation of this novel detector is further detailed hereinunder.

All of the other listed environment detectors are well known in the art and require no further description herein. For example, Phytech Ltd., 79145 Yad Mordechai, Israel, distributes air humidity detectors, air temperature detectors, solar radiation detectors, soil moisture detectors and soil temperature detectors, which can be used with system 20 according to the present invention.

It will be appreciated by one ordinarily skilled in the art that additional environment detectors, such as, but not limited to, carbon dioxide or fluorescence detectors can also be employed with system 20 according to the present invention.

System 20 according to this aspect of the present invention further includes at least one canopy detector 38 which serves for monitoring at least one parameter of the plant itself.

As used herein in the specification and in the claims section that follows, the term "canopy" refers to any portion of the plant which is protruding from the ground, including, but not limited to, the main stem, branches, leaves, fruits, flowers and the like.

Such detectors 38 can include, for example, a leaf temperature detector 40, a flower temperature detector 42, a fruit surface temperature detector 44, a stem flux relative rate detector 46, a stem diameter variation detector 48, a fruit growth rate detector 50 and a leaf $CO_2$ exchange detector 52.

All of the above listed canopy detectors are well known in the art and require no further description herein. For example, Phytech Ltd., 79145 Yad Mordechai, Israel, distributes leaf temperature detectors, flower temperature detectors, fruit surface temperature detectors, stem flux relative rate detectors, stem diameter variation detectors, fruit growth rate detectors and leaf $CO_2$ exchange detectors which can be used with system 20 according to the present invention.

It will be appreciated by one ordinarily skilled in the art that additional plant detectors, such as but not limited to, fluorescence detectors can also be employed with system 20 according to the present invention.

System 20 according to this aspect of the present invention further includes a processor 50. Processor 50 serves for processing the parameters derived from the plant's environment and the parameters derived from the plant itself.

Processor 50 further serves for obtaining (calculating, averaging, mathematically extracting, etc.) processed parameters of the plant's environment and processed parameters of the plant itself.

Processor 50 preferably forms a part of a personal or dedicated computer system including, in addition to processor 50, memories, drivers, user interfaces (e.g., mouse, annotation device, keyboard), and the like, as well known in the art of computers.

System 20 according to this aspect of the present invention further includes a display 52. Display 52 serves for co-displaying the processed parameters of the plant's environment and the processed parameters of the plant itself in a unique and easy to interpret presentation mode, as further detailed herein.

Thus, a processed parameter of the plant's environment is realized on display 52 by a first displayed area 54 of a first color selected among at least two first colors, wherein each of these first colors represents a range of that parameter of the plant's environment. Similarly, a processed parameter of the plant itself is realized by a second displayed area 56 of a second color selected among at least two second colors, wherein each of these second colors represents a range of that parameter of the plant's itself.

As used herein in the specification and in the claims section that follows, the term "display" includes any type of presentation device, including, but not limited to, a computer screen display, a monitor display, an image projector and a printer.

Thus, system 20 according to this aspect of the present invention can be used for displaying stress states of crop and its close environment. Advantages afforded by system 20 provide immediate determination of current and previous stress events. The situation can be represented as a daily, weekly, monthly, etc., pictorial information containing, for example, a symbolic plant which represents the actual plant, against a background which represent the actual environment thereof. Three colors are preferably used to independently comprehend situations in the plant and in the environment. These colors are preferably red, indicating a stress situation, yellow, indicating a moderate stress situation and green, indicating a no stress situation. These colors are presently advantageous because they are used in a similar context in other aspects of life (e.g., in traffic lights). Thus, an image representing a simplified plant against a background with different combinations of these three colors, describes both environmental conditions and the ability of plants to combat stress imposed thereon. A quick glance at the display allows a grower to become aware of the stress condition of the plant and the stress imposed thereon by the environment.

Figure 2:
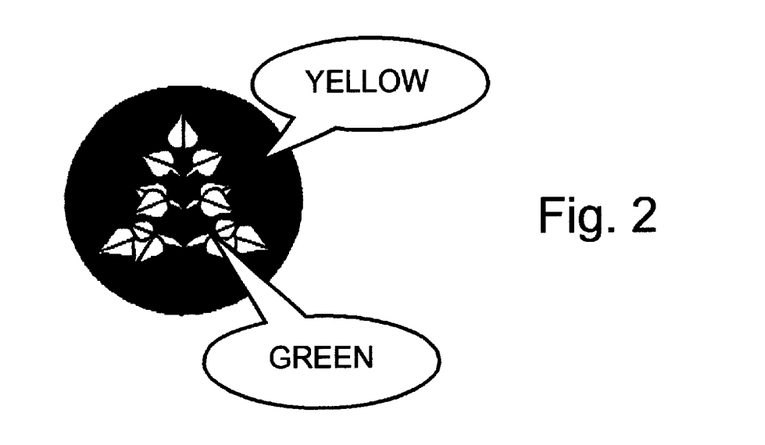
FIGS. 2–4 are exemplary images displayable by the system of FIG. 1.
Figure 3:
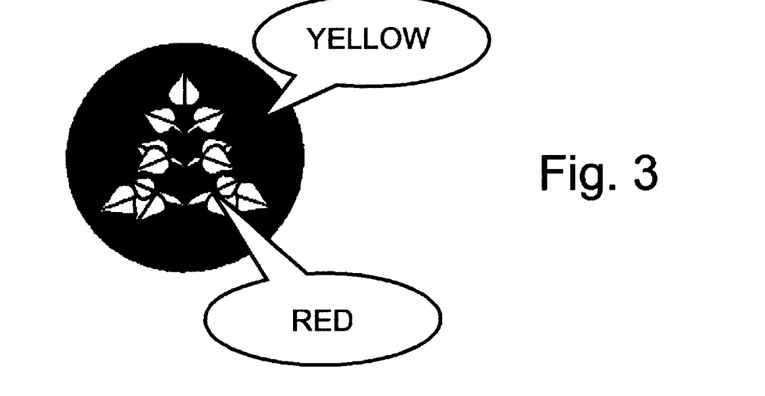
Figure 4:
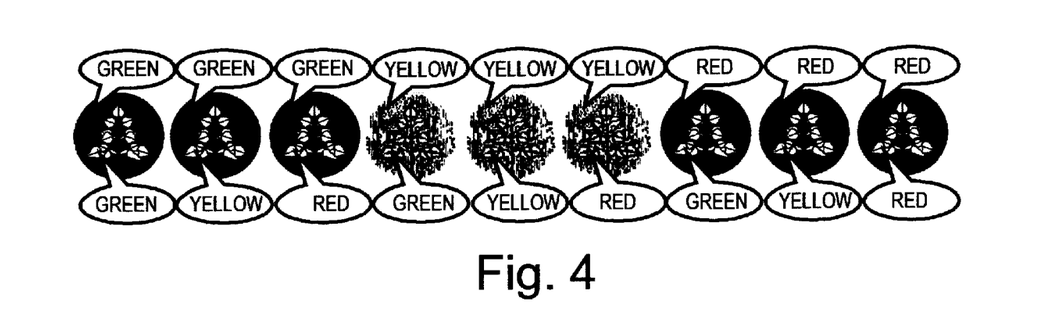

This is further exemplified in FIGS. 2–4. FIG. 2 shows a pictogram of elevated air temperature (as indicated by the yellow background) while the canopy's temperature is normal (as indicated by the green plant image), apparently due to effective transpiration.

FIG. 3 shows a second pictogram relating to the same parameter (temperature). However, in this case, the elevated air temperature (as indicated by the yellow background) results in high canopy temperature (as indicated by the red plant image) caused, for example, by soil water deficit and low transpiration by the plant as a result thereof.

FIG. 3 shows all of the possible plant and environment combinations in terms of the preferred red, yellow and green colors.

Table 1 below provides examples of environment parameter ranges used according to preferred embodiments of the present invention to define one of the three stress conditions as indicated by the background colors red, yellow and green.

TABLE 1

| Environmental factor | Red Color (severe stress) | Yellow Color (moderate stress) | Green (norm) |
| --- | --- | --- | --- |
| Air temperature | Above 38° C. Below 3° C. | 33–38° C. 3–10° C. | 10–33° C. |
| Vapor Pressure Deficit | Above 3 kPa | 1.7–3 kPa | 0–1.7 kPa |
| Soil Temperature | Above 33° C. Below 5° C. | 25–33° C. 5–12° C. | 12–25° C. |

Thus, according to another aspect, the present invention provides a method for displaying a state of a plant and it's environment. The method according to this aspect of the invention is effected by implementing the following method steps, in which in a first step, at least one parameter of the plant's environment is monitored. In a second step of the method according to this aspect of the present invention, at least one parameter of the plant itself is monitored. Then, the parameters derived from the plant's environment and the parameters derived from the plant itself are processed for obtaining processed parameters of the plant's environment and processed parameter of the plant itself. Eventually, the processed parameters of the plant's environment and the processed parameters of the plant itself are co-displayed such that the processed parameters of the plant's environment are realized by a first displayed area of a first color selected among at least two first colors, wherein each of the at least two first colors represents a range of at least one parameter of the plants environment, and further such that each of the processed parameters of the plant itself is realized by a second displayed area of a second color selected among at least two second colors, wherein each of the at least two second colors represents a range of at least one parameter of the plant's itself.

It will be appreciated by one ordinarily skilled in the art that system 20 can be integrated into an irrigation control system, so as to provide fully automated and stress states responsive irrigation system.

Figure 5:
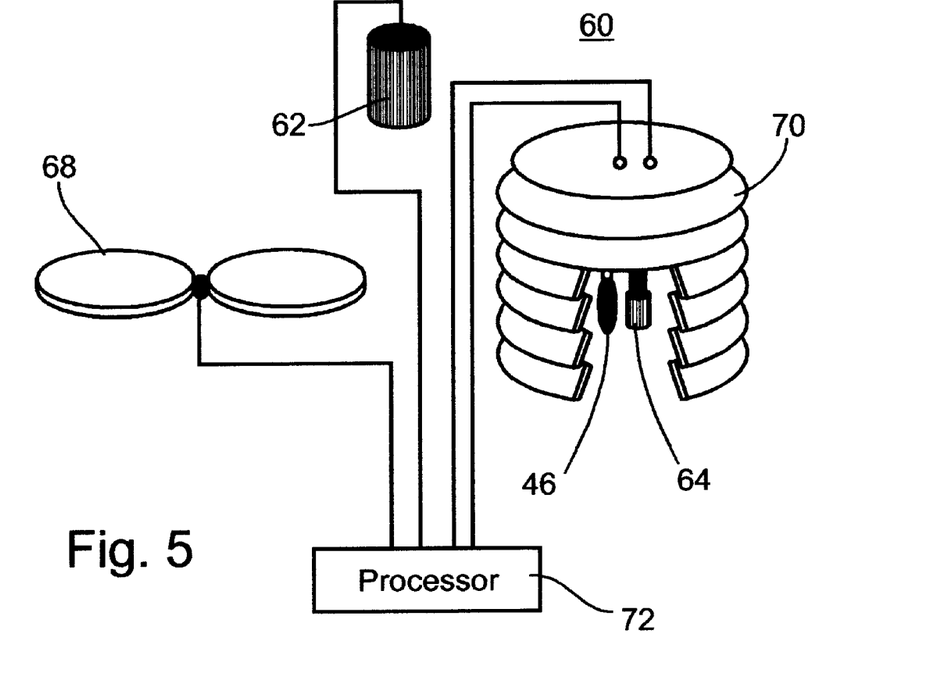
FIG. 5 is a schematic depiction of a system for estimating the evapo-transpiration from a plant according to another aspect of the present invention, which system incorporates, in particular, detectors for detecting environmental radiation, air humidity, temperature and boundary diffusion layer resistance at the vicinity of the plant, and a processor for calculating, based on said data, a value corresponding to the evapo-transpiration from the plant.

As shown in FIG. 5, according to yet another aspect, the present invention provides a system for estimating evapotranspiration from a plant, which is referred to hereinbelow as system 60.

System 60 includes a first detector 62 which serves for detecting environmental radiation at a vicinity of the plant. System 60 further includes a second detector 64 which serves for detecting air humidity at the vicinity of the plant. System 60 further includes a third detector 66 which serves for detecting air temperature at the vicinity of the plant. System 60 further includes a fourth detector 68 which serves for detecting boundary diffusion layer resistance at the vicinity of the plant. A radiation shield 70 is preferably employed to protect detectors 64 and 66 from direct radiation.

System 60 further includes a processor 72. Processor 72 communicates with detectors 62, 64, 66 and 68 for retrieving data therefrom and for calculating, based on that data, a value corresponding to the evapo-transpiration from the plant. Detectors 62, 64, 66 are further described hereinabove in context with detectors 24, 26 and 30 (FIG. 1). The construction and operation of detector 68 are further detailed hereinunder.

According to still another aspect of the present invention there is provided a method of estimating evapo-transpiration from a plant. The method is effected by implementing the following method steps, in which, in a first step, values corresponding to an environmental radiation, an air humidity, an air temperature and a boundary diffusion layer resistance at a vicinity of the plant are collected. Then, the collected values are used for calculating a value corresponding to the evapo-transpiration from the plant.

As detailed in the Background section hereinabove, numerous models for estimating daily evaporation from a plant are available and are currently in use. The major difference between the various models is derived from the input data they require. As further detailed in the Background section, one of the most developed models is known as the Penman equation, see Equation 1 above, which is also shown below:

$$LE = \frac{s}{s+\gamma}R_n + \frac{\rho_a C_a}{r_b}\frac{D}{s+\gamma} \quad \text{(Equation 1)}$$

where E is the evaporative water flux density (kg m$^{-2}$s$^{-1}$); L is the heat of evaporation (J kg$^{-1}$); s is the slope of the saturated vapor pressure curve (Pa K$^{-1}$); γ is the thermodynamic psychrometric constant (Pa K$^{-1}$); $R_n$ is the net radiation (W m$^{-2}$); $\rho_a$ is the air density (kg m$^{-3}$); $C_a$ is the specific air heat (J kg$^{-1}$s$^{-1}$); D is the vapor pressure saturation deficit (Pa); and $r_b$ is the boundary diffusion layer resistance (s m$^{-1}$).

It will be appreciated from Equation 1 that in a case where the radiation, the air temperature and the air humidity are determined, all the parameters of Equation 1 can be extracted therefrom, except for the boundary diffusion layer resistance (rb).

It is known that heat transfer from a surface is subjected to restrictions imposed by the boundary diffusion layer resistance in a manner which is nearly identical to that imposed on mass transfer (evaporation) from the same surface, as heat and vapor transfer take place at nearly the same rate. The heat transfer from a surface can be described as follows:

$$H = \rho_a C_a \frac{Ts - Ta}{r_b} \quad \text{(Equation 2)}$$

where H is the sensed heat flux density (W m−2); Ts is the surface temperature (° K); and Ta is the ambient air temperature (° K).

If the surface temperature is within a few degrees of the air temperature, the dependence H=f(Ts−Ta) derived from Equation 2 can be assumed as linear and the error introduces by such a linearity assumption to be small. In turn, this means that Equation 2 also holds true for wet surfaces of a given temperature, Tw.

In addition, Equation 2 also holds true in cases where Ts and Tw do not differ to a great extent from the air temperature. Even if (Tw−Ta) is negative, as may be the case for a surface of a transpirating plant, and (Ts−Ta) is positive, as is the case in the detector to be described herein, Equation 2 holds true. Thus, Equation 2 may be applied to a detector in order to determine the rb value, as based on dissipation of heat from a surface, which is necessary for calculating Equation 1.

Figure 6:
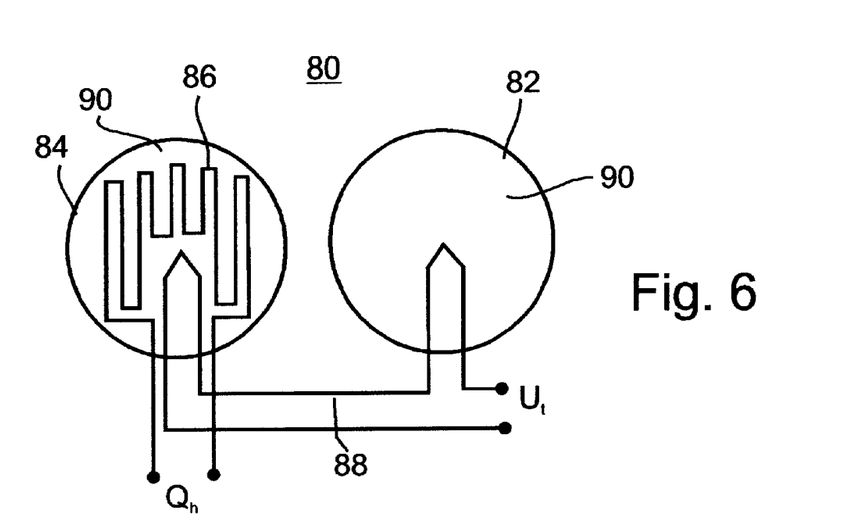
FIG. 6 is a schematic depiction of a device for measuring the evapo-transpirative resistance of a boundary diffusion layer in an environment according to still another aspect of the present invention.

A suitable detector is shown in FIG. 6 and is referred to herein as device 80. Thus, device 80 according to this aspect of the present invention serves for detecting the evapo-transpirative resistance of a boundary diffusion layer in an environment.

Device 80 includes a first element 82, which is referred to hereinbelow as passive element 82, having a first diffusion layer surrounding it, and a second element 84 having a second diffusion layer surrounding it. Element 84 includes a source of thermal energy 86 embedded therein, such as a heating wire of known resistivity and is to therefore referred to hereinbelow as active element 84.

Device 80 further includes a thermocouple 88 coupling passive element 82 and active element 84. Each of elements 82 and 84 preferably includes a metal plate 90, wherein thermocouple 88 serves for measuring the temperature difference of these plates 90.

Thus, according to still another aspect of the present invention there is provided a method for measuring the evapo-transpirative resistance of a boundary diffusion layer in an environment. The method according to this aspect of the invention is effected by implementing the following method steps, in which, in a first step a detector, such as device 80 which is described herein, is introduced into the environment.

Then, source 88 is used for providing second element 84 with a quanta of thermal energy.

Finally, the temperature difference between each of passive 82 and active 84 elements and the environment, and while accounting for the air density and the specific air heat of the environment and further for the mean flux density of available radiation of each of elements 82 and 84, the evapo-transpirative resistance of the boundary diffusion layer in the environment is calculated.

The energy balance for passive element 82, when in a steady state of heat exchange with the environment, can be represented as follows:

$$R_1 = \rho_a C_a \frac{T_1 - Ta}{r_b} \quad \text{(Equation 3)}$$

whereas, the energy balance for active element 84, when in a steady state of heat exchange with the environment, can be represented as follows:

$$Q + R_2 = \rho_a C_a \frac{T_2 - Ta}{r_b} \quad \text{(Equation 4)}$$

where R1 and R2 are the mean flux density of available radiation (W m−2), T1 and T2 are the temperature of elements 82 and 84, respectively, and Q is the known power provided by source 86.

Elements 82 and 84 are preferably identical in terms of material of make, and surface, thus, the first diffusion layer of passive element 82 and the second diffusion layer of active element are 84 identical, such that the mean flux density of available radiation of each of elements 82 and 84, R1 and R2, respectively, are identical. It will be appreciated that corrections for elements having different surface areas can be incorporated in Equations 3 and 4.

Subtracting Equation 3 from Equation 4 leads to:

$$\frac{Q}{T_2 - T_1} = \frac{\rho_a C_a}{r_b} \qquad \text{(Equation 5)}$$

Appropriately incorporating the left side of Equation 5 in the right side of Equation 1 results in:

$$LE = \frac{s}{s+\gamma} R_n + \frac{Q}{\Delta T} \frac{D}{s+\gamma} \qquad \text{(Equation 6)}$$

where $\Delta T = T2 - T1$.

It will be appreciated that all of the parameters in the right side of equation 6 are readily extractable from data derived from detectors 62, 64, 66 and 68 (FIG. 5).

Thus, by employing conventional climatic measures, such as radiation, air temperature and air humidity combined with a novel measure related to the boundary diffusion layer resistance, one can estimate the evapo-transpiration of a plant, LE ($J\ m^{-2} s^{-1}$).

Elements 82 and 84 are preferably made of a metal, such as, but not limited to, chromium plated copper, having a diameter of between 0.5 and 3.0 cm, preferably of about 1.5 cm, and a thickness of between 1 and 3 mm, preferably of about 2 mm.

Source 86 is characterized by dissipating power of between 10 and 100 mW, preferably of about 50 mW, resistance of between 10 and 100 Ohm, preferably of about 50 Ohm and current of between 20 and 70 mA, preferably of about 45 mA.

Thermocouple 88 is preferably made of copper and a constantan alloy (type T), and has sensitivity of between 20 and 60 mkV/° K, preferably of about 40 mkV/° K.

Figure 7:
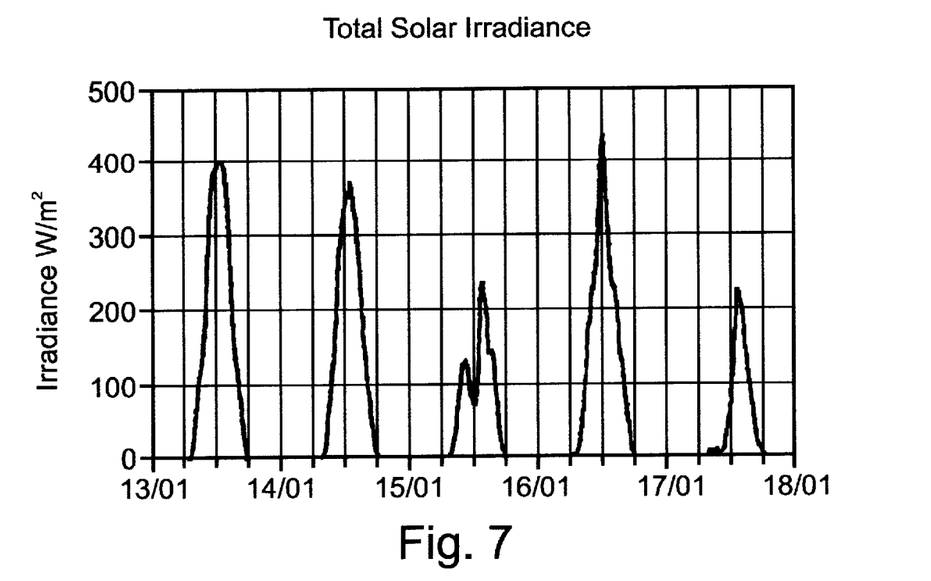
FIG. 7 demonstrates a plot representing the solar radiation in a greenhouse environment over five consecutive days in mid January in Israel.
Figure 8:
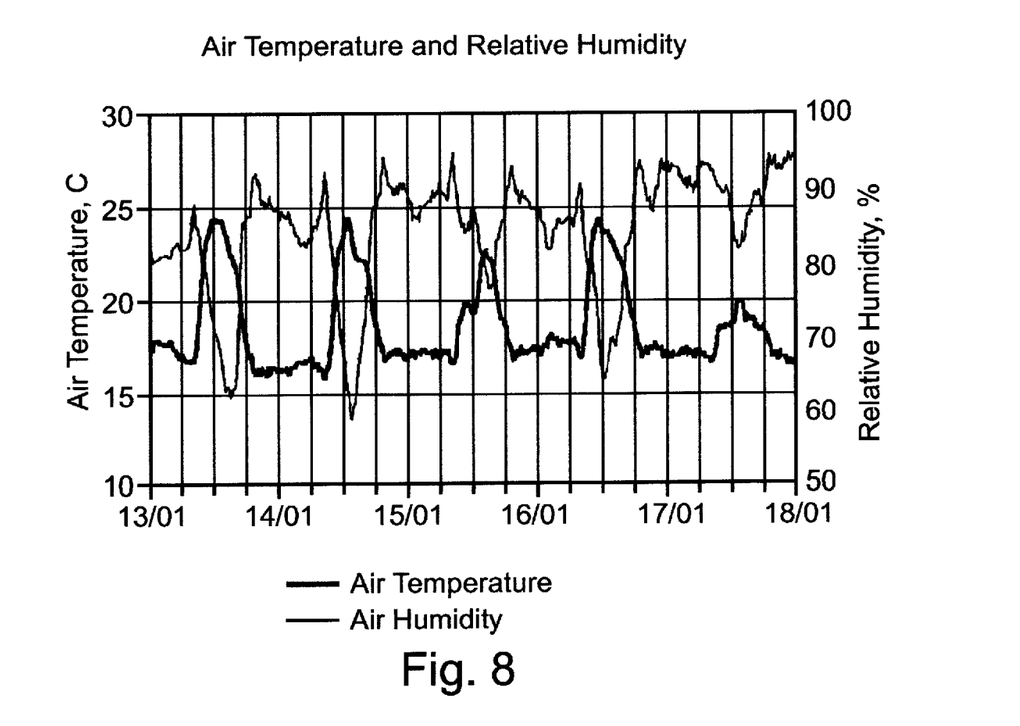
FIG. 8 demonstrates plots representing the air temperature and humidity in the greenhouse environment over said five consecutive days.
Figure 9:
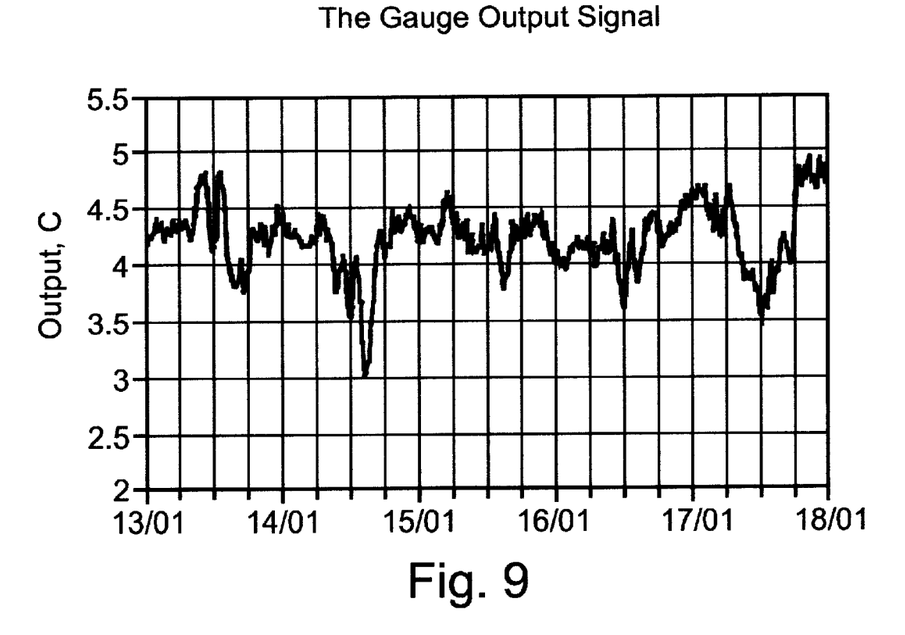
FIG. 9 demonstrates a plot representing the output ($\Delta T$) of the device of FIG. 6 in the greenhouse environment over said five consecutive days.
Figure 10:
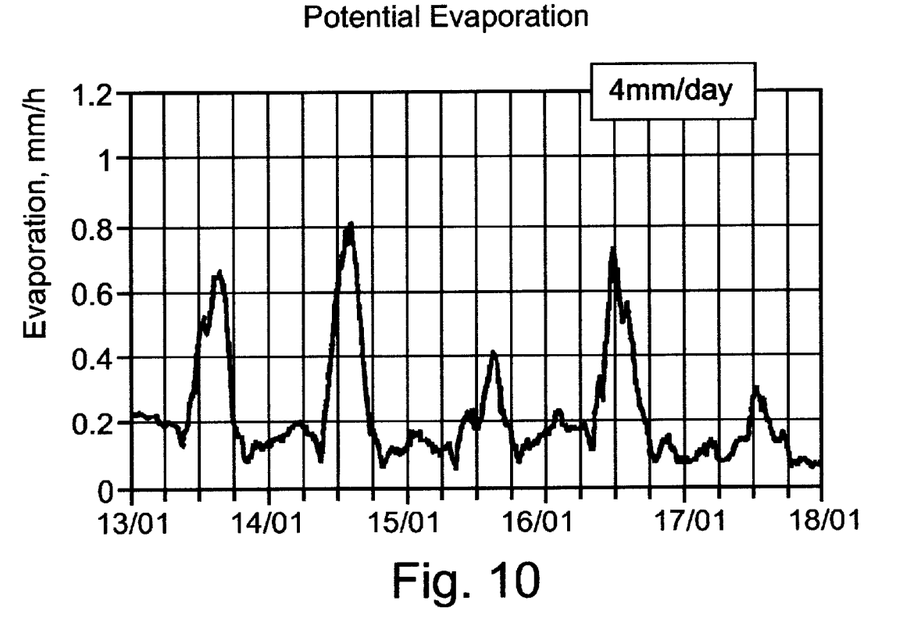
FIG. 10 demonstrates a plot calculated based on the data derived from the plots of FIGS. 7–9 and Equation 6, which reflects the calculated potential evaporation of a plant grown in the greenhouse during said five consecutive days in mid January in Israel.

FIGS. 7–9 demonstrate measurements measured using system 60 according to the present invention. Thus, records of solar radiation, air temperature, relative air humidity and the output ($\Delta T$) of device 80 according to the present invention, recorded continuously over five consecutive days in January in Israel are shown. The data presented in FIGS. 7–9 was thereafter used together with Equation 6 to calculate the plot of FIG. 10, which therefore represents the potential evaporation of a plant grown in the same environment monitored by the various detectors of system 60.

The numerical values of the factors in Equation 6 can be calculated according to the well-known formulas, such as, for example:

$$D = 619 \cdot \exp(17.08085 \cdot Ta/(234.174 + Ta)) \cdot (1-\phi) \qquad \text{(Equation 7)}$$

where $\phi$ is the relative humidity; $\gamma = 0.68$. s (Equation 6) is therefore the differential of Equation (7) at temperature Ta.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for co-displaying a state of a plant and its environment, the system comprising:
   (a) at least one environment detector for monitoring at least one parameter of the plant's environment;
   (b) at least one canopy detector for monitoring at least one parameter of the plant itself;
   (c) a processor for processing said at least one parameter of the plant's environment and said at least one parameter of the plant itself for obtaining at least one processed parameter of the plant's environment and at least one processed parameter of the plant itself; and
   (d) a display for co-displaying said at least one processed parameter of the plant's environment and said at least one processed parameter of the plant itself, such that each of said at least one processed parameter of the plant's environment is realized by a first displayed area of a first color selected among at least two first colors, wherein each of said at least two first colors represents a range of said at least one parameter of the plant's environment, and further such that each of said at least one processed parameter of the plant itself is realized by a second displayed area of a second color selected among at least two second colors, wherein each of said at least two second colors represents a range of said at least one parameter of the plant's itself.

2. The system of claim 1, wherein each of said first color and said second color is independently selected from the group consisting of a red color, a green color and a yellow color.

3. The system of claim 1, wherein said at least one environment detector and said at least one canopy detector detect a parameter of the same nature.

4. The system of claim 1, wherein said at least one environment detector is selected from the group consisting of an air humidity detector, an air temperature detector, a boundary diffusion layer resistance detector, a solar radiation detector, a soil moisture detector and a soil temperature detector.

5. The system of claim 1, wherein said at least one canopy detector is selected from the group consisting of a leaf temperature detector, a flower temperature detector, a fruit surface temperature detector, a stem flux relative rate detector, a stem diameter variation detector, a fruit growth rate detector and a leaf $CO_2$ exchange detector.

6. The system of claim 1, wherein said display is selected from the group consisting of a computer screen display, a monitor display, an image projector and a printer.

7. A method for displaying a state of a plant and it's environment, the method comprising the steps of:
   (a) monitoring at least one parameter of the plant's environment;
   (b) monitoring at least one parameter of the plant itself;
   (c) processing said at least one parameter of the plant's environment and said at least one parameter of the plant itself for obtaining at least one processed parameter of the plant's environment and at least one processed parameter of the plant itself; and
   (d) co-displaying said at least one processed parameter of the plant's environment and said at least one processed parameter of the plant itself, such that each of said at least one processed parameter of the plant's environment is realized by a first displayed area of a first color selected among at least two first colors, wherein each of said at least two first colors represents a range of said at least one parameter of the plant's environment, and further such that each of said at least one processed parameter of the plant itself is realized by a second displayed area of a second color selected among at least two second colors, wherein each of said at least two second colors represents a range of said at least one parameter of the plant's itself.

8. The method of claim 7, wherein each of said first color and said second color is independently selected from the group consisting of a red color, a green color and a yellow color.

9. The method of claim 7, wherein said at least one parameter of the plant's environment and said at least one parameter of the plant itself are of the same nature.

10. The method of claim 7, wherein said step of monitoring said at least one parameter of the plant's environment is effected by at least one environment detector selected from the group consisting of an air humidity detector, an air temperature detector, a boundary diffusion layer resistance detector, a solar radiation detector, a soil moisture detector and a soil temperature detector.

11. The method of claim 7, wherein said step of monitoring said at least one parameter of the plant itself is effected by at least one canopy detector selected from the group consisting of a leaf temperature detector, a flower temperature detector, a fruit surface temperature detector, a stem flux relative rate detector, a stem diameter variation detector, a fruit growth rate detector and a leaf $CO_2$ exchange detector.

12. The method of claim 7, wherein said step of co-displaying said at least one processed parameter of the plants environment and said at least one processed parameter of the plant itself is effected by a display selected from the group consisting of a computer screen display, a monitor display, a projected image display and a printed image display.

13. A system for estimating evapo-transpiration from a plant, the system comprising:
  (a) a first detector for detecting environmental radiation at a vicinity of the plant;
  (b) a second detector for detecting air humidity at a vicinity of the plant;
  (c) a third detector for detecting air temperature at a vicinity of the plant;
  (d) a fourth detector for detecting boundary diffusion layer resistance at a vicinity of the plant; and
  (e) a processor communicating with said first, second, third and fourth detectors for retrieving data from said first, second third and fourth detectors and for calculating, based on said data, a value corresponding to the evapo-transpiration from the plant;
  wherein said fourth detector includes:
    (i) a first element having a first diffusion layer;
    (ii) a second element having a second diffusion layer and a source of thermal energy therein; and
    (iii) a thermocouple coupling said first element and said second element;
  wherein, when said source of thermal energy provides said second element with a quanta of thermal energy, measuring a temperature difference between each of said first and second elements and the environment and accounting for an air density and a specific air heat of the environment and farther for mean flux density of available radiation of each of said first and second elements, enables to determine said evapo-transpirative resistance of the boundary diffusion layer in the environment.

14. A method of estimating evapo-transpiration from a plant, the method comprising the steps of:
  (a) collecting values corresponding to an environmental radiation, an air humidity, an air temperature;
  (b) using a dedicated detector to collect a value corresponding to a boundary diffusion layer resistance at a vicinity of the plant; and
  (c) using said values collected in steps (a) and (b) for calculating a value corresponding to the evapo-transpiration from the plant;
  wherein said detector includes:
    (i) a first element having a first diffusion layer;
    (ii) a second element having a second diffusion layer and a source of thermal energy therein; and
    (iii) a thermocouple coupling said first element and said second element;
  wherein, when said source of thermal energy provides said second element with a quanta of thermal energy, measuring a temperature difference between each of said first and second elements and the environment and accounting for an air density and a specific air heat of the environment and further for mean flux density of available radiation of each of said first and second elements, enables to determine said evapo-transpirative resistance of the boundary diffusion layer in the environment.

15. A device for detecting the evapo-transpirative resistance of a boundary diffusion layer in an environment, the device comprising:
  (a) a first element having a first diffusion layer;
  (b) a second element having a second diffusion layer and a source of thermal energy therein; and
  (c) a thermocouple coupling said first element and said second element;
  wherein, when said source of thermal energy provides said second element with a quanta of thermal energy, measuring a temperature difference between each of said first and second elements and the environment and accounting for an air density and a specific air heat of the environment and further for mean flux density of available radiation of each of said first and second elements, enables to determine said evapo-transpirative resistance of the boundary diffusion layer in the environment.

16. The device of claim 15, wherein said first diffusion layer of said first element and said second diffusion layer of said second element are identical, such that said mean flux density of available radiation of each of said first and second elements are identical.

17. A method for measuring the evapo-transpirative resistance of a boundary diffusion layer in an environment, the method comprising the steps of:
  (a) introducing into the environment a detector including:
    (i) a first element having a first diffusion layer;
    (ii) a second element having a second diffusion layer and a source of thermal energy therein; and
    (iii) a thermocouple coupling said first element and said second element;
  (b) using said source of thermal energy for providing said second element of said detector with a quanta of thermal energy; and
  (c) measuring a temperature difference between each of said first and second elements and the environment and while accounting for an air density and a specific air heat of the environment and further for a mean flux density of available radiation of each of said first and second elements calculating said evapo-transpirative resistance of the boundary diffusion layer in the environment.

* * * * *